United States Patent [19]

Mucheyer

[11] Patent Number: 4,484,480

[45] Date of Patent: Nov. 27, 1984

[54] LOAD MEASURING APPARATUS

[75] Inventor: Norbert Mucheyer, Rechtenbach, Fed. Rep. of Germany

[73] Assignee: Mannesmann Rexroth GmbH, Lohr am Main, Fed. Rep. of Germany

[21] Appl. No.: 507,960

[22] Filed: Jun. 27, 1983

Related U.S. Application Data

[63] Continuation of Ser. No. 254,286, Apr. 15, 1981.

[30] Foreign Application Priority Data

Apr. 28, 1980 [DE] Fed. Rep. of Germany ....... 3016348

[51] Int. Cl.$^3$ .............................................. G01L 1/00
[52] U.S. Cl. .................................. 73/862.64; 73/768; 177/229
[58] Field of Search ............. 177/210 FP, 210 R, 211, 177/229; 73/862.62, 862.63, 862.65, 768, DIG. 4; 338/2

[56] References Cited

U.S. PATENT DOCUMENTS

| | | | |
|---|---|---|---|
| 3,201,977 | 8/1965 | Kutsay | 73/862.65 X |
| 3,447,367 | 6/1969 | Taylor | 338/2 X |
| 4,151,502 | 4/1979 | Kurihara | 338/2 |
| 4,258,565 | 3/1981 | Sawayama | 73/862.64 |
| 4,280,363 | 7/1981 | Johansson | 73/862.65 X |

Primary Examiner—Joseph W. Hartary
Attorney, Agent, or Firm—Oblon, Fisher, Spivak, McClelland & Maier

[57] ABSTRACT

A load measuring apparatus for determining a load affecting a predetermined point of a mechanical system including a solid state member to which the load is directly transmitted and an integrated monolithic sensor, connected with the solid state member, with directional sensitivity to deformation, the sensor producing an electrical signal proportional to the load. The solid state member includes a unilaterally fixed rigid flexional beam having a freely protruding end portion thereof under load stress and a section thereof close to a fixing point which contains in locking contact the sensor which is sensitized in the direction of the maximum inner deformation of the flexional beam.

8 Claims, 3 Drawing Figures

LOAD MEASURING APPARATUS

This application is a continuation of application Ser. No. 254,286, filed Apr. 15, 1981.

BACKGROUND OF THE INVENTION

1. Field of the Invention

The invention relates to a load measuring apparatus.

2. Description of the Prior Art

Conventional load measuring systems operate on the principle of, for instance, displacement sensor elements being attached by glueing onto a complex mechanical system, consisting of wire strain gauges and measuring their deformations optically or electrically, respectively. The high rigidity of this load measuring system results in high critical frequencies and therefore in advantages when measuring dynamic stresses. The attachment of these sensor elements, however, is a complicated process requiring a high degree of dexterity and precision, or the alignment of a measuring bridge thus established is difficult to obtain.

An additional method of record for the measuring of loads consists in hodometry by means of a conventional displacement sensor at a flexional spring, dimensioned in accordance with the area of application of the measuring device, and the load impact point being properly selected. In this instance, care must be taken that the resulting lift of the flexional spring is sufficiently high for the displacement sensor.

It is not possible to make this lift too small, so that a low frequency of the load measuring system as such is the result. An additional disadvantage consists in the fact that the number of the movable parts is increased by the necessary load travel, resulting in problems of attrition which reduce the dependability of the load measuring system.

SUMMARY OF THE INVENTION

An object of the invention is to provide a load measuring system of the above described type which permits reproduceable measurements and which serves as a basis for the development of a load measuring device which is easy to utilize, which needs elements which can be produced economically and which are suited for manufacture in large series.

With respect to the system, the invention includes a load measuring apparatus for determining a load affecting a predetermined point of a mechanical system including a solid state member to which said load is directly transmitted and an integrated monolithic sensor, connected with the solid state member, with directional sensitivity to deformation, the sensor producing an electrical signal proportional to the load. The solid state member includes a unilaterally fixed rigid flexional beam having a freely protruding end portion thereof under load stress and a section thereof close to a fixing point which contains in locking contact the sensor which is sensitized in the direction of the maximum inner deformation of the flexional beam.

The use of a rigid mechanical solid state system as the load registering element is the prerequisite for a high proper frequency of the load measuring system. The insertion of a directionally sensitized deformation sensor into a suitable location of the solid state system guarantees the inertia-free transmission of the load signals to the load-value receiver and limits the stray values of these measurements, i.e., such takes care of a high degree of reproductivity of the measured values. Problems of attrition resulting from elements handling the load-path conversion therefore no longer exist.

The simplicity of the units of the present invention and of the design guarantee a high degree of reliability. The system is rigid and therfore has a high natural frequency. The number of elements is limited to the flexional beam and the sensor, which directly and without any bridge members registers the deformation of the flexional beam. The introduction of errors is thus largely avoided.

In the present invention, the bore to contain the sensor is easily made, and the fitting of the corresponding surfaces is easily achieved. Thus, the manufacture and the assembly of the load measuring system can be done automatically, without diminished reliability and quality of the measurements obtained. The arrangement of the receptacle bore and the fixation of the sensor within the bore permit the integration of a sensor having sensitivity in one radial direction only, for instance a semiconductor sensor, so that this sensor may be fully utilized as to its function and may be supplied a high degree of sensitivity.

The characteristics of the present invention permit an additional increase in the dependability of the device, inasmuch as the most sensitive point of the system, the sensor, is, in this manner, shielded from any ambient influences and there is no chance of any corrosion or other undesirable side effects.

At the same time an exchange of the sensor is possible by drilling the sensor bore for replacement of the device, making the system easily serviceable.

The design of the sensor in accordance with the present invention also permits load measurement in the tensile and in the pressure areas without requiring a more complex load measuring system.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
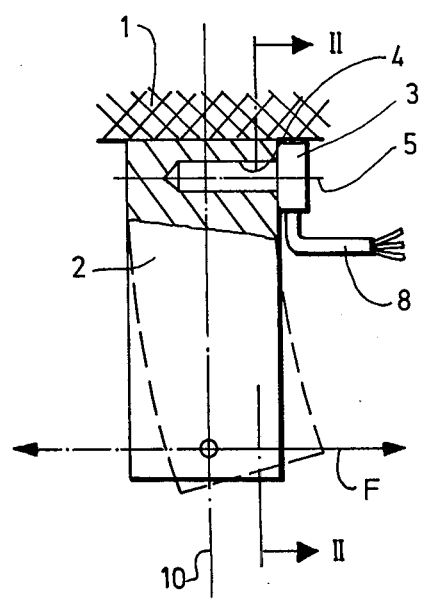
FIG. 1 is a lateral view of an embodiment of the invention, showing the load measuring device.
Figure 2:
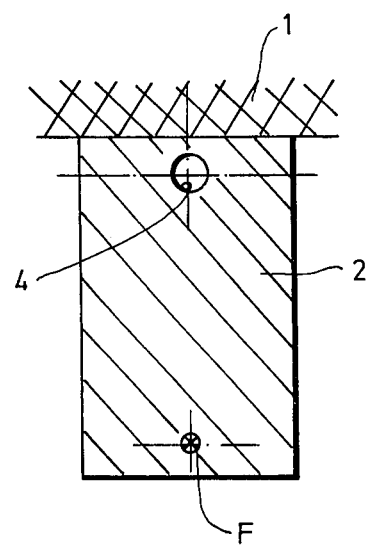
FIG. 2 is a sectional view taken along line II—II in FIG. 1.
Figure 3:
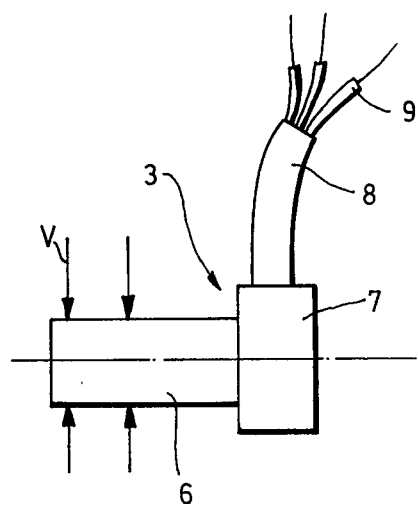
FIG. 3 is a magnified presentation of the sensor of FIG. 1.

The load measuring device shown in FIGS. 1 and 2 includes a flexional beam 2, fixed at one side within a rigid body 1 and a sensor 3, which, as an example, may be a semi-conductor sensor monolithically integrated into the flexional beam. Flexional beam 2 has a definite direction of deformation in which direction a load F acts with a force to be measured. Flexional beam 2, at a suitable point, for instance at the point of the greatest curvature of its bending line, has a bore 4, the axis of the bore running parallel to the direction of the load.

A monolithic sensor 3 with a shaft 6 and a collar 7 is fitted into this bore 4 in direct locking contact, at the pressure-side of the flexional beam 3, while it is possible to hermetically seal bore 4 by glueing the sensor 3 into place. Sensor 3 has a connecting cable 8 and various lines 9 transmitting the signal to the measuring device.

Sensor 3 is so designed that its shaft 6 has a preferred direction of deformation V, by means of which shaft it produces an electric signal in proportion to the said deformation. Preferably, sensor 3 is arranged at a point at which a definite, disturbance-free deformation of the flexional beam takes place, which is directly proportional to the load F.

As shown in FIGS. 1 and 2, flexional beam 2 is deformed under the influence of the load F in a manner indicated by a dotted line, thereby causing deformation of the bore 4. This causes sensor 3 to be affected in the pressure area of the flexional beam 2, in the direction V, deforming it so that a signal, in proportion to the load F, is produced.

Sensor 3 may be so dimensioned and positioned that it comes to rest on both sides of the neutral axis 10. This means that the load F is not limited to an effect in one direction only, and it permits the measuring of oscillating forces. In this case, a signal proportionate to the load results from the integration of the deformation of the sensor across the respective area of pressure.

The shape of sensor 3 is not limited to that of a cylindrical body. It is understood that the sensor may be designed as a flat or other geometrically dimensioned body which can be held within a correspondingly dimensioned opening within the flexional beam system, e.g., within a slit.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A load measuring apparatus for being secured to a main body to determine a load affecting a predetermined point of a mechanical system, comprising:
   solid state means to which said load is directly transmitted and having a recess formed therein; and
   a load detecting sensor unit incorporated within said solid state means for producing an electrical signal proportional to said load, wherein said solid state means further comprises a cantilever type beam portion having a protruding end under load and, adjacent its fixed point to said main body, a portion containing said sensor unit, and wherein said sensor unit further comprises a sensor body and being secured within said recess in said cantilever beam adjacent a fixed portion thereof at a pressure side of the beam such that said recess runs parallel to the direction of load introduction and positively receives said sensor unit.

2. An apparatus as set forth in claim 1, further comprising means for hermetically sealing said recess.

3. An apparatus as set forth in claim 1, wherein said sensor body extends at opposite ends thereof beyond a neutral axis portion of said cantilever beam.

4. An apparatus as set forth in claim 3, wherein said sensory unit is positively fitted in said recess at a position of maximum inner deformation of said recess in said direction of sensitivity.

5. An apparatus as set forth in claim 4, further comprising means for hermetically sealing said recess.

6. A load measuring apparatus for being secured to a main body to determine a load affecting a predetermined point of a mechanical system, comprising:
   solid state means to which said load is directly transmitted and having a recess formed therein, with an axis and
   a load detecting sensor unit incorporated within said solid state means for producing an electric signal proportional to said load, wherein said solid state means further comprises a cantilever type beam portion having a freely protruding end portion under load and, adjacent its fixed point to said main body, a portion containing said sensor unit and a sensor body non-rotatably and immovably secured within said recess in the cantilever beam adjacent a fixed portion thereof at a pressure side of the beam, said sensor body having a preferred direction of deformation perpendicular to the axis of said recess and wherein said recess runs parallel to the direction of load introduction.

7. An apparatus as set forth in claim 6, further comprising means for hermetically sealing said recess.

8. A load measuring apparatus for being secured to a main body to determine a load affecting a predetermined point of a mechanical system, comprising:
   solid state means to which said load is directly transmitted and having a recess formed therein with an axis; and
   a load detecting sensory unit incorporated with said solid state means for producing an electrical signal proportional to said load, wherein said sensory unit is formed by monolithic body which is in direct contact said recess in the solid state means, wherein said solid state means further comprises a cantilever beam portion having a protruding end under load and, adjacent its fixed point to said main body, a portion containing said sensor unit, and a sensor body being positively fitted within said recess in said cantilever beam adjacent a fixed portion thereof at a pressure side of the beam, said sensor body having a preferred direction of deformation perpendicular to the axis of said recess, said recess running parallel to a direction of load introduction and said sensor unit extending at opposite sides thereof beyond the neutral axis portion of said cantilever beam.

* * * * *